United States Patent
Würzbauer et al.

(10) Patent No.: US 11,358,849 B2
(45) Date of Patent: Jun. 14, 2022

(54) MEDIA DISTRIBUTOR FOR A ROTARY MACHINE AND FILLING MACHINE

(71) Applicant: KRONES AG, Neutraubling (DE)

(72) Inventors: Georg Würzbauer, Pfakofen (DE); Christopher Wittmann, Bruck (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/552,346

(22) Filed: Aug. 27, 2019

(65) Prior Publication Data
US 2020/0079636 A1    Mar. 12, 2020

(30) Foreign Application Priority Data
Sep. 7, 2018 (DE) .......................... 102018215227.6

(51) Int. Cl.
*B67C 3/22*      (2006.01)
*B67C 3/28*      (2006.01)

(52) U.S. Cl.
CPC ................ *B67C 3/225* (2013.01); *B67C 3/28* (2013.01)

(58) Field of Classification Search
CPC ... B67C 3/225; B67C 3/28; B67C 3/22; F16L 27/0804; F16L 41/03; F16K 11/20; F16K 11/22; B65B 3/04
USPC ........................................................ 137/883
See application file for complete search history.

(56) References Cited

U.S. PATENT DOCUMENTS

| | | | | |
|---|---|---|---|---|
| 3,082,795 A | * | 3/1963 | Heller | F16L 27/111 138/121 |
| 3,951,186 A | * | 4/1976 | Mencacci | B67C 3/10 141/5 |
| 4,037,861 A | * | 7/1977 | Medney | F16L 27/0816 285/181 |
| 4,561,680 A | * | 12/1985 | Gerber | F16L 27/0861 285/278 |
| 4,688,611 A | * | 8/1987 | Yoshida | B67C 3/002 141/146 |

(Continued)

FOREIGN PATENT DOCUMENTS

| | | | | |
|---|---|---|---|---|
| CN | 102756814 B | * | 3/2014 | .............. B67C 3/22 |
| CN | 105217551 A | | 1/2016 | |

(Continued)

OTHER PUBLICATIONS

DE-1902049-A1 English Translation of Specification (Year: 2020).*
CN-102756814-B English Translation of Specification (Year: 2020).*
DE-29620323-U1 English Translation of Specification (Year: 2020).*
Extended European Search Report for Application No. 19188073.1, dated Feb. 7, 2020.

(Continued)

*Primary Examiner* — Timothy P. Kelly
*Assistant Examiner* — Stephanie A Shrieves
(74) *Attorney, Agent, or Firm* — Marshall, Gerstein & Borun LLP

(57) ABSTRACT

A device for distributing fluid media for a rotary machine, in particular a filling machine, including: a rotary distributor having a non-rotatably designed first assembly and a second assembly designed to be rotatable about a machine's axis of rotation, wherein the first assembly comprises one or several supply points for at least one fluid medium, and one or several supply lines for the at least one fluid medium connected with the supply point or supply points, wherein at least one supply line includes two or more lying swivel joints whose axes of rotation are arranged essentially in parallel to the machine's axis of rotation.

13 Claims, 2 Drawing Sheets

(56) References Cited

U.S. PATENT DOCUMENTS

| | | | | |
|---|---|---|---|---|
| 5,551,491 | A * | 9/1996 | Baruffato | B65B 39/145 |
| | | | | 141/119 |
| 6,581,653 | B2 * | 6/2003 | Servadei | B67C 3/22 |
| | | | | 53/381.1 |
| 6,810,927 | B2 * | 11/2004 | Ronchi | B67C 3/208 |
| | | | | 141/144 |
| 9,441,770 | B2 * | 9/2016 | Burgmeier | F16L 21/00 |
| 10,800,642 | B2 * | 10/2020 | Braun | B67C 3/06 |
| 2006/0131873 | A1 * | 6/2006 | Klingbail | F16L 27/0845 |
| | | | | 285/147.1 |
| 2006/0204372 | A1 * | 9/2006 | Scampoli | E04G 21/0418 |
| | | | | 417/313 |
| 2009/0084465 | A1 * | 4/2009 | Burgmeier | F16L 21/00 |
| | | | | 141/368 |
| 2015/0375981 | A1 * | 12/2015 | Knieling | F16L 58/10 |
| | | | | 141/144 |
| 2016/0341345 | A1 * | 11/2016 | Williams | F16L 27/0861 |
| 2017/0276274 | A1 * | 9/2017 | Michot | F16C 41/002 |
| 2018/0080588 | A1 * | 3/2018 | Uchikawa | F16L 27/087 |
| 2018/0222738 | A1 | 8/2018 | Braun | |

FOREIGN PATENT DOCUMENTS

| | | | |
|---|---|---|---|
| DE | 73429 A | 11/1951 | |
| DE | 1902049 A1 * | 8/1970 | ............... B67C 3/22 |
| DE | 29620323 U1 * | 1/1997 | ............... B67C 3/22 |
| DE | 60009176 T2 | 2/2005 | |
| DE | 102014109082 A1 | 12/2015 | |
| DE | 102015118671 A1 | 5/2017 | |
| EP | 1020360 A2 | 7/2000 | |
| EP | 2357151 A2 | 8/2011 | |
| JP | H04-339792 A | 11/1992 | |
| JP | H07-052997 A | 2/1995 | |
| JP | H09-104285 A | 4/1997 | |
| WO | WO-2016/138856 A1 | 9/2016 | |

OTHER PUBLICATIONS

Search Report for German Patent Application No. 102018215227.6, dated Feb. 18, 2019.

* cited by examiner

MEDIA DISTRIBUTOR FOR A ROTARY MACHINE AND FILLING MACHINE

CROSS-REFERENCE TO RELATED APPLICATION

The present application claims priority to Germany Application No. 102018215227.6, filed Sep. 7, 2018. The priority application, DE 102018215227.6, is hereby incorporated by reference.

FIELD OF THE INVENTION

The present invention relates to a device for distributing fluid media to a rotary machine and a filling machine having such a media distributor.

PRIOR ART

From prior art, a plurality of rotary machines are known where a plurality of workstations are arranged on the periphery of a rotating machine, for example in the form of a carousel, which perform identical or different working steps at objects circumferentially carried along, for example containers or preforms.

In such rotary machines, it is generally required to transport liquid or gaseous, i.e. fluid media from a stationary part of the plant to the respective workstations. In the process, the transfer to the rotating part of the plant is effected, as known from prior art, via so-called rotary distributors.

It is for example known from prior art to fill containers, such as bottles and cans, in beverage filling lines by means of a filling machine designed as a rotary machine, where a plurality of filling elements are arranged at the periphery of a filler carousel and are provided for introducing a filling product into the respective container to be filled. During the filling process, the containers to be filled are held underneath the respective filling element and correspondingly circulate, together with the filling element, at the filler carousel.

It is known to provide a rotary distributor to transfer the filling product from a stationary part of the plant to the rotating part of the plant, i.e. the filler carousel, and to also transfer operating media, such as, for example, pre-pressurization gas or pneumatic or hydraulic media, to the filler carousel.

Such a rotary distributor generally comprises a distributor shaft and a distributor housing or a distributor head. Here, either the distributor shaft or the distributor head is designed to be stationary, while the distributor head or the distributor shaft are vice versa designed to be rotatable. The stationary part of the rotary distributor is connected with suited supply means for the required media via pipelines. Suitably designed channels and, if required, valves are provided within the rotary distributor via which the supplied media are forwarded to corresponding outlets of the rotatably designed part of the rotary distributor. The outlets of the rotating part of the rotary distributor are in turn connected to the workstations via corresponding lines, wherein in addition, ring channels may be provided to reduce the number of required connection lines.

From Patent Publication DE 10 2014 109 082 A1 of the applicant, for example, a rotary distributor is known whose distributor head is designed to be rotating while the corresponding distributor shaft is designed to be stationary, i.e. not rotating. In contrast, from Patent Publication DE 10 2015 118 671 A1 of the applicant, a rotary distributor is known which comprises a distributor housing firmly connected to the stationary part of the plant, while the distributor shaft is connected to the filler carousel, i.e. the rotary part of the plant.

Apart from the mentioned rotary fillers, other rotary machines, for example sterilization machines, blow moulding machines, direct printing machines and the like, also employ rotary distributors to distribute the respectively required media to the corresponding workstations.

Due to the often considerable size of such rotary machines, very long pipelines are sometimes employed to connect the rotary distributor generally arranged centrically on, above or underneath the rotary machine, with separately arranged means for media supply, for example a valve cluster. Here, the pipelines are subject to sometimes considerable expansions due to thermal fluctuations during the operation of the rotary machine. Such expansions are particularly distinct along the pipelines during a Cleaning-in-Place (CIP) process as it has to be generally performed at regular intervals for cleaning the workstations.

During this process, the thermal expansions of the pipelines sometimes generate considerable mechanical tension forces which can only be limited by an arrangement of the machine components, in particular the position of the valve cluster with respect to the rotary machine, that is as precise as possible. This on the one hand results in considerable installation efforts. On the other hand, the occurring forces may lead to damages to the pipelines and supply point during the operation of the plant if the installation is faulty.

Therefore, the object underlying the present invention is to provide a device for distributing fluid media for a rotary machine and a filling machine having such a media distributor which eliminate the above-described disadvantages. In particular, the forces on the pipelines and the rotary distributor occurring during the operation are to be minimized and the installation of the plant facilitated. In particular, the devices are to be robust with respect to installation errors.

DESCRIPTION OF THE INVENTION

The above-mentioned objects are achieved by a device for distributing fluid media for a rotary machine, in particular a filling machine, having a rotary distributor with a non-rotatable first assembly and a second assembly rotatable about an axis of rotation of the machine, wherein the first assembly comprises one or several supply points for at least one fluid medium, and having one or several supply lines for the at least one fluid medium which are connected with the supply point or supply points, wherein at least one supply line comprises two or more lying swivel joints whose axes of rotation are arranged essentially in parallel to the axis of rotation of the machine.

If several supply lines are provided for various media, each supply line may be connected with one or several supply points. For example, for each medium, exactly one supply line may be provided which is connected with one or several supply points of the first assembly. An assembly here and below designates a subunit of the rotary distributor.

Fluid media here and below are to be understood as those media that are liquid or gaseous. Examples of liquid media are filling products, such as beverages, and liquid sterilization or cleansing agents. Examples of gaseous media are purge gases, pressurization gases, and control or compressed air.

Rotary machines and filling machines are generally known in prior art so that a detailed description is dispensed with herein. In particular, the design as a rotary machine in the form of a filler carousel with a plurality of filling elements, as they are described in the above-mentioned patent publications, are known. The device for distributing the fluid media may be embodied as part of the rotary machine or separate from the latter. In general, the rotary second assembly is arranged at the rotating part of the plant of the rotary machine and connected therewith.

The machine's axis of rotation is determined by the rotational axis of the rotary machine. It coincides, according to the invention, with the axis of rotation of the rotary second assembly as the rotary machine and the second assembly of the rotary distributor rotate synchronously. However, it should be noted that the rotary distributor may be embodied to be height adjustable, in particular together with a part of the rotary machine. Thus, the non-rotary first assembly may also be embodied to move along the machine's axis of rotation, i.e. to be height adjustable. As an alternative, the rotary distributor, and in particular the first assembly, may be, however, stationary, i.e. neither movable along the machine's axis of rotation.

The one or several supply lines create fluid connections for the medium or the media between a supply unit for the media, for example the valve cluster mentioned below and/or respective storage devices, and the first assembly of the rotary distributor. Here, the supply lines may comprise a plurality of segments which may be embodied as rigid or flexible pipe connections. The segments may be connected to each other via threaded, flanged or welded joints.

According to the invention, however, at least one supply line comprises two or more swivel joints, wherein at least one lying swivel joint connects successive segments of the supply line to each other. Thereby, the segments may be rotated relative with respect to each other, or one segment may be rotated relative to a supply point, for example the first assembly.

Swivel joints for pipe connections, i.e. pipe joints, are generally known in prior art. The swivel joints may be embodied, for example, with a radial seal and a ball bearing. An inner part of the swivel joint that is, for example, connected with a first pipe joint, is rotatably held within an outer part of the swivel joint which in turn may be connected, for example, with a second pipe segment. Here, the bores of the inner and outer parts of the swivel joint may be on one axis or else form an angle, in particular a right angle, with respect to each other. Correspondingly, the connected segments may form a line or include an angle with respect to each other. The same applies if a bore of the swivel joint is directly connected with a supply point of the first assembly of the rotary distributor.

According to the invention, the axes of rotation of the two or more lying swivel joints are arranged essentially in parallel to the machine's axis of rotation. Here and below, it is assumed that even with angled swivel joints, only one pipe segment is rotating with respect to the swivel joint, while the other pipe segment is firmly connected with the swivel joint. The present invention may, however, also be extended to swivel joints where both segments are connected in a rotating manner. In this case, at least one of the two axes of rotation is arranged essentially in parallel to the machine's axis of rotation.

An essentially parallel arrangement of the axis of rotation and the machine's axis of rotation is given if between the axis of rotation and the machine's axis of rotation, there is an angle that is maximally 5°, preferably maximally 2°, particularly preferred 0° within work tolerances.

Due to the essentially parallel arrangement of the axes of rotation of the two or more swivel joints with respect to the machine's axis of rotation, these swivel joints are here and below designated as lying swivel joints since the machine's axis of rotation of conventional rotary machines is generally arranged perpendicular to the floor space of the machine. In contrast to this, such swivel joints whose axes of rotation are oriented essentially perpendicular to the machine's axis of rotation are designated, here and below, as vertical swivel joints.

The provision of lying swivel joints at the supply lines permits to decouple, as described below more in detail, the thermal expansion of the supply lines from the rotary distributor and the valve cluster. This on the one hand reduces the occurring tensions, on the other hand, however, facilitates the installation of the plant.

According to a development, at least one supply line may comprise exactly two lying swivel joints. Such a supply line may in particular comprise exclusively lying swivel joints, i.e. no vertical swivel joints. However, it is also possible that one or several supply lines comprise, in addition to the lying swivel joints, one or several vertical swivel joints whose respective axis of rotation is perpendicular to the machine's axis of rotation. Moreover, one or several supply lines may comprise more than two lying swivel joints. Depending on the suspension of the supply line, vertical swivel joints may, however, lead to a depression forming at the lower vertical swivel joint where liquid will remain. If no height adjustment of the rotary distributor is required, vertical swivel joints may preferably be dispensed with to avoid the formation of such a depression since an arrangement with exclusively lying swivel joints does not allow for a vertical lowering of the supply line as the degrees of freedom of the swivel joints do not reach into this direction. Such an arrangement is on the one hand more hygienic, on the other hand, however, also compacter. Moreover, due to the low number of swivel joints, wear is reduced.

A development with exactly two lying swivel joints is particularly compact and easy to install.

At least two of the two or more lying swivel joints may comprise axes of rotation that are arranged offset with respect to each other. Here, the axes of rotation of these at least two swivel joints are perpendicularly offset with respect to each other. One of the axes of rotation may coincide with the machine's axis of rotation.

The provision of at least two lying swivel joints with offset axes of rotation leads to the part of the supply line lying between these two swivel joints assuming the function of a handle bar. Thereby, the longitudinal expansions of the pipelines due to thermal fluctuations may be decoupled from the supply unit and the rotary distributor by shifting this handle bar.

In particular, a segment of the supply line between the at least two lying swivel joints may be embodied in an S- or U-shape or comprise an S-shaped sub-segment and/or a U-shaped sub-segment. The S-shaped or U-shaped part of the supply line here acts as a handle bar which permits a relative shifting of the parts of the supply line that join the lying swivel joints which limit the segment, or the subsequent rotary distributor.

According to a development, at least one of the two or more lying swivel joints may connect segments of the supply line at an essentially right angle. In this manner, angle segments of the pipeline may be spared, thus further facilitating the construction.

According to a further development, a further one of the two or more lying swivel joints may connect the supply line with a supply point of the first assembly. Here, the corresponding supply point of the first assembly may in particular be arranged such that the axis of rotation of the further lying swivel joint coincides with the machine's axis of rotation or is parallel to it. For example, the supply point may be provided as a bore in a distributor plate of the rotary distributor that is arranged at the upper or lower front face of the rotary distributor. Such an arrangement is in particular advantageous for the supply line for the filling product of a filling machine.

According to a development, the at least one supply line may be connected with a supply point of the first assembly for a cleansing agent for CIP cleaning. In the CIP process, hot cleansing agent is often guided via the supply line and the rotary distributor to the parts of the workstations to be cleaned. The supply line for the CIP cleansing agent is thus subjected to particularly high thermal fluctuations. Longitudinal expansions of the pipelines in the CIP process in the order of 6 to 10 mm are absolutely common. The above described developments of the supply line for the CIP cleansing agent with two or more lying swivel joints are able to compensate expansions occurring during the CIP process, in particular by changing the angular position of the intermediate segment of the supply line acting as a handle bar by the thermal expansion. In this manner, the occurring tensions may be considerably reduced, which by implication reduces the demands on the exact installation of the rotary distributor and the supply unit, for example the valve cluster.

According to a development, at least two supply lines with two or more lying swivel joints each may be provided, a first supply line of which being connected, by means of a lying swivel joint, with an axially arranged supply point of the first assembly, and a second supply line with a laterally arranged supply point of the first assembly. An axially arranged supply point has a bore whose boring axis is arranged in parallel to the machine's axis of rotation or coincides with the latter. A laterally arranged supply point is arranged, in contrast, at a shell side of the rotary distributor.

With an axially arranged supply point, the connection of the corresponding supply line is possible directly via a lying swivel joint, whereby the plant construction may be further facilitated. Depending on the embodiment of the rotary distributor, in particular of the channels arranged within the rotary distributor, it may be necessary, however, to connect at least one supply line with a laterally arranged supply point of the first assembly. In this case, the connection may be effected either in a rigid manner, for example via welding or a flange, or via a vertical swivel joint. The described developments with two or more lying swivel joints may be advantageously employed for all supply lines which are subject to considerable thermal fluctuations during the operation of the rotary machine. For example, for the filling product, too, such a supply line may be provided if the filling product is to be filled at a temperature considerably deviating from ambient temperature, for example when it is cooled. However, there may also be provided supply lines which do not comprise the above-described two or more lying swivel joints.

According to a development, the first assembly may, as already mentioned above, comprise a distributor shaft of the rotary distributor, and the second assembly may comprise a distributor head of the rotary distributor, so that the distributor head is configured to be rotary with respect to the distributor shaft. The embodiment of the distributor shaft and the distributor head may in particular be effected as described in Patent Publication DE 10 2014 109 082 A1. According to this development, the one or several supply lines for the at least one fluid medium are thus connected with the distributor shaft, while in the distributor head, a plurality of outlet openings for discharging the fluid media to media lines is provided which in turn feed the media to the individual workstations. Here, as is known per se, one or several ring channels may be provided as part of the rotating part of the plant which are connected with the corresponding outlet openings in the distributor head.

According to an alternative development, the first assembly may, as also mentioned above, comprise a distributor head of the rotary distributor, and the second assembly may comprise a distributor shaft of the rotary distributor, so that the distributor shaft is designed to be rotary with respect to the distributor head. The embodiment of the distributor shaft and the distributor head may in particular be effected as described in Patent Publication DE 10 2015 118 671 A1. According to this development, the one or several supply lines for the at least one fluid medium are thus connected with the distributor head, while via corresponding ring channels between the distributor head and the distributor shaft and corresponding ring channels and axial channels in the distributor shaft, a forwarding of the media to a plurality of outlet openings, which may be provided, for example, in a distributor plate, is effected. From the outlet openings, corresponding media lines to the workstations or to intermediate ring channels are provided.

The present invention also provides a filling machine for filling containers with a filling product comprising a stationary part of the plant and a part of the plant rotatable with respect to the stationary part of the plant at which at least one filling valve for filling a container to be filled with a filling product is arranged, wherein the filling machine furthermore comprises a device according to one of the above-described developments, wherein the first assembly is arranged at the stationary part of the plant, and the second assembly is arranged at the rotatable part of the plant, and wherein the at least one fluid medium comprises the filling product.

The filling machine may in particular be embodied, as already mentioned several times, as a rotary machine, for example in the form of a filler carousel, where a plurality of filling elements is arranged at the periphery of the filler carousel. The stationary part of the plant comprises the part of the filling machine that does not rotate and is standing, for example, on a floor space. The rotatable part of the plant in particular comprises the filler carousel with the circulating filling elements and container receptacles. The containers may be bottles, cans or the like. The filling product may in particular be a beverage. According to this development, the first assembly is arranged at the stationary part of the plant and in particular mechanically connected to it. Thus, the first assembly is neither embodied to be rotating. In contrast, the second assembly is arranged at the rotatable part of the plant and in particular mechanically connected to it. Thus, the second assembly, too, is designed to be rotatable and rotates together with the rotatable part of the plant. The at least one fluid medium comprises, according to this development, the filling product, so that at least one supply line may be provided according to the above-described developments for the filling product.

A filling machine designed in such a manner is, as already mentioned several times, particularly easy to erect and particularly compact due to the special development of the supply lines. The compensation of occurring thermal tensions by the lying swivel joints here prevents damages to the distributor, for example by a breaking of a bearing.

According to a special development, the first assembly may be firmly connected to the stationary part of the plant. According to this development, the first assembly is thus not movable along the machine's axis of rotation. Such a development may in particular be employed in filling machines without height adjustment, wherein the formation of a depression in the supply line as described above is effectively prevented. In filling machines with a height adjustment, however, in addition to the above-described lying swivel joints, vertical swivel joints may also be provided as part of the supply lines to permit a travel of the first assembly and thus the rotary distributor along the machine's axis of rotation.

According to a development, the filling machine may furthermore comprise a valve cluster for supplying the at least one fluid medium, wherein the one or several supply lines connect the valve cluster with the rotary distributor. Valve clusters are generally known in prior art and are employed to realize a multifarious guidance of media within a small space in an overseeable manner. The control of the valves may be effected, for example, via a pneumatic drive. From the stationary valve cluster, supply lines for the fluid media to corresponding storage units, for example reservoirs, are generally provided. According to this development, the valve cluster is embodied as part of the filling machine. As an alternative, the valve cluster may be also provided, however, for a common media supply of further parts of the plant, for example a blow moulding machine. Here, supply lines according to the above-described developments to each of the supplied parts of the plant may be provided with a rotary distributor.

According to a development, a supply line for the filling product and at least one further supply line for at least one further fluid medium may be provided. The filling product may be a beverage, as already mentioned. As already described, the first supply line for the filling product may in particular be connected with an axially arranged supply point of the first assembly. The at least one second supply line for at least one further fluid medium may in particular be connected, as already described, with a laterally arranged supply point of the first assembly. At least one second supply line may, however, also be connected with a further axial supply point of the first assembly. The connection of the supply lines to corresponding supply points of the first assembly may here be effected depending on the requirement of the filling machine or the installation plan. The described developments are particularly compact and only place low demands on the avoidance of installation errors.

The further fluid medium may be or comprise a purge gas, a pressurization gas, a sterilization agent, a cleansing agent or control/compressed air. In particular, for each fluid medium, at least one supply line according to the above-described developments may be provided. As mentioned above, a supply line for a CIP cleansing agent embodied in this manner is particularly advantageous, but for example pressurization gases, such as carbon dioxide, may also be advantageously provided through one of the above-described supply lines due to their often low temperature.

The described devices and filling machines have a pipework that decouples possibly occurring tension forces from the rotary distributor. Furthermore, fewer parts are required which also leads to shorter construction times. On the other hand, installation is facilitated. Errors in the manufacture or in the installation of the valve cluster may also be compensated by the better movability of the pipework. Thereby, follow-up works in the assembly may be largely eliminated. Moreover, with the described developments, there is no longer any risk that the slope in the supply lines cannot be optimally adjusted and thus the lines sag.

Further features and exemplary embodiments as well as advantages of the present invention will be illustrated more in detail hereinafter with reference to the drawings. It will be understood that the embodiments do not exhaust the field of the present invention. It will be furthermore understood that some or all features described below may also be combined with each other in a different way.

DETAILED DESCRIPTION OF THE PREFERRED EMBODIMENTS

Figure 1:
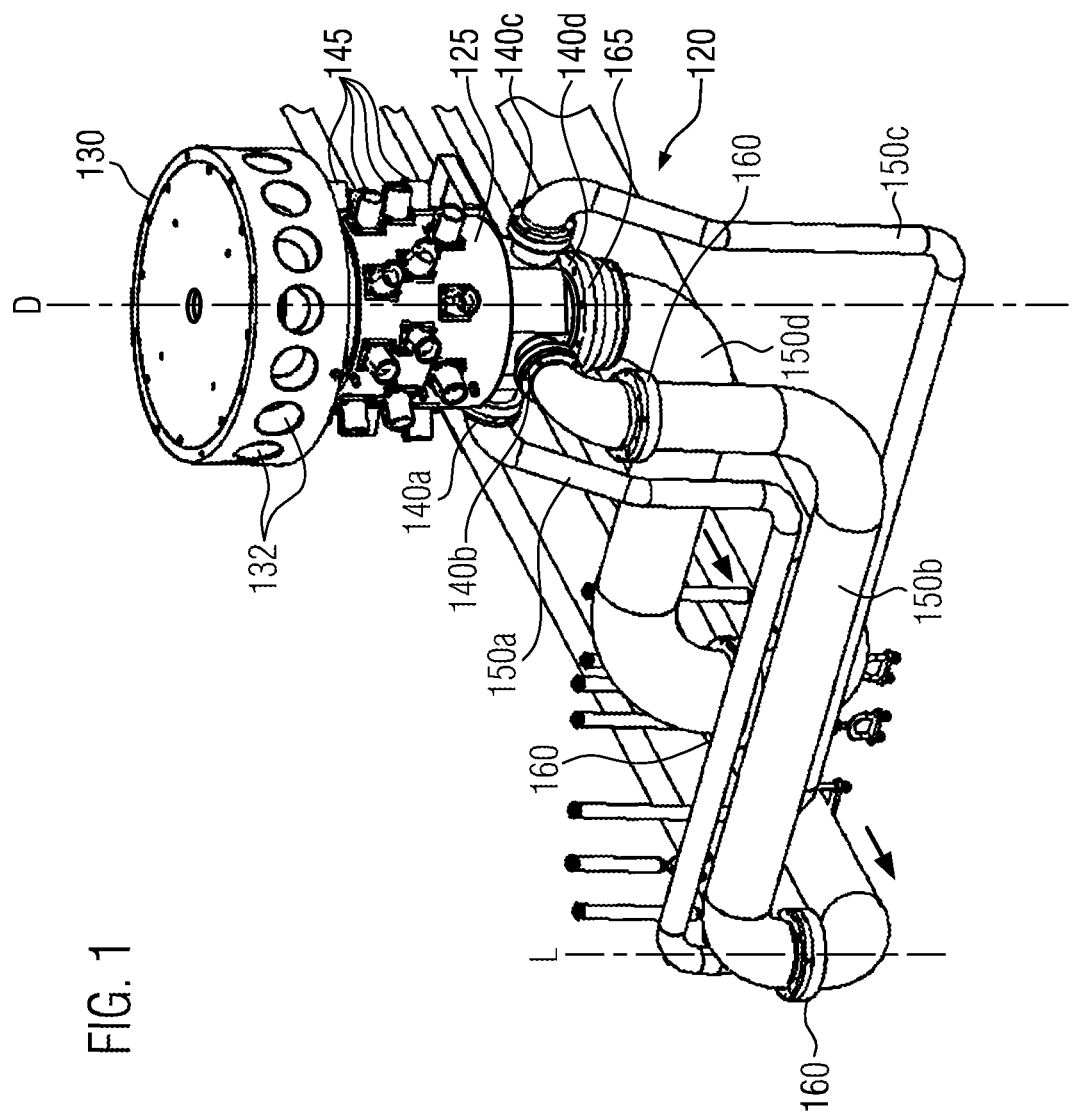
FIG. 1 schematically shows a three-dimensional view of a rotary distributor with supply lines with lying swivel joints according to the present invention.

In the Figures described below, identical reference numerals designate identical elements. For a better overview, identical elements will be only described when they appear for the first time. It will be appreciated, however, that the variations and embodiments of an element described with reference to one of the Figures may also be applied to the corresponding elements in the other Figures.

In FIG. 1, a three-dimensional view of a device for distributing fluid media for a rotary machine having a rotary distributor and supply lines with lying swivel joints according to the present invention is schematically shown. For a better overview, in the representation of FIG. 1, parts, in particular the rotary machine itself, that are not essential for the understanding of the present invention are omitted. It will be appreciated, however, that the principle of the present invention demonstrated with respect to FIG. 1 may be employed in connection with most diverse rotary machines by variations of the rotary distributor itself and its arrangement with respect to the rotary machine known per se.

Without restricting the generality, in FIG. 1, a rotary distributor 120 is represented whose first, non-rotating assembly 125 is embodied as a distributor shaft, while the second, rotatably designed assembly 130 is embodied as a distributor head. The first assembly 125 would thus be connected with a stationary part of the plant (not represented) of the rotary machine, while the second assembly 130 would be connected, for example via media lines (not represented) which connect the plurality of outlet openings 132 of the distributor head with the workstations (not represented), with the rotating part of the plant of the rotary machine.

The machine's axis of rotation D about which both the rotating part of the plant of the rotary machine and the rotatably designed second assembly 130 rotates, is shown in FIG. 1 by a dashed line. The machine's axis of rotation D is generally standing vertically on a floor space of the rotary machine.

The represented rotary distributor 120 is provided for being employed in a filling machine. The filling product is supplied via an axial supply point 140*d* in the lower front face of the first assembly 125 via the supply line 150*d* and subsequently, after having passed corresponding internal channels of the rotary distributor 120, forwarded via the outlet openings 132 of the distributor head 130 to the filling elements of the filling machine.

Via laterally arranged supply points 140*a-c* of the first assembly 125, moreover supply lines 150*a-c* for further fluid media, for example a CIP cleansing liquid, but also compressed gases, control air or sterilization agents, are connected to the rotary distributor. Finally, the non-limiting development of the rotary distributor 120 represented in FIG. 1 shows a plurality of further lateral supply points 145 in the non-rotating, first assembly 125, via which further media, for example additional beverage components, gases and the like, may be supplied to the filling product. The mixing of these further media with the filling product takes place in correspondingly embodied channels of the rotary distributor.

The supply lines 150*a-d* represented in FIG. 1 by way of example may be flanged, for example, to a valve cluster (not represented) for providing the fluid media. Equally, the lateral supply points 140*a-c* are connected to the respective supply lines 150*a-c* via flanges.

Among the four supply lines 150*a-d* represented by way of example here, the supply line 150*b* for the CIP cleansing agent, and the supply line 150*d* for the filling product are embodied with two lying swivel joints 160 and 165 each according to the present invention. Both for the CIP cleansing agent and for the filling product, sometimes considerable thermal fluctuations may occur, depending on the operating state of the filling machine. For example, the temperature of the CIP cleansing agent may be up to 80° C. In contrast, the filling product may be cooled and filled into the containers, for example, at 4° C. In both cases, the temperature of the respective medium considerably deviates from ambient temperature in the respective operating phase, so that the respective supply lines expand along the pushing direction indicated by the arrows in FIG. 1 by several millimetres to centimetres.

To absorb the tensions occurring due to this expansion, the supply lines 150*b* and 150*d* are embodied with two lying swivel joints 160 and 165, respectively, whose axes of rotation are oriented in parallel to the machine's axis of rotation D. For the first swivel joint 160 of the supply line 150*b*, the axis of rotation L is indicated by way of example by a dashed line. Thus, the segments of the supply line 150*b* following the swivel joint 160 are rotatable about this axis of rotation L. In combination with the second lying swivel joint 160 of the supply line 150*b* arranged downstream, according to the represented development, a central segment of the supply line between the two swivel joints is realized and has the function of a handle bar.

In other words, by the offset arrangement of the axes of rotation of the two lying swivel joints, the central segment between the two swivel joints may be tilted or swivelled relative to the rest of the supply line. A thermal expansion of the long part of the supply line 150*b* shown in FIG. 1 in the direction of the arrow will thus rotate the central segment with respect to the two swivel joints 160 and thereby decouple the longitudinal expansion of the long part of the supply line from the supply point 140*b* and the rotary distributor 120.

The special development of the supply line 150*b* has an S-shaped central segment between the two lying swivel joints 160. Moreover, the further segments of the supply line connected to the two swivel joints are oriented in the same direction. The special development, however, is not compulsory for the functionality of the handle bar but may also be achieved with a U-shaped central segment or more complex shapes.

As was demonstrated with respect to the supply line 150*d* for the filling product in FIG. 1, the orientation of the adjacent segments of the supply line in the same direction is neither compulsory. The S-shaped central segment of the supply line 150*d* is rather connected with its one end via a lying swivel joint 160 to the long part of the supply line, while it is connected with its other end directly via a lying swivel joint 165 to the axial supply point 140*d* of the first assembly 125. As here, too, the axes of rotation of the two swivel joints 160 and 165 are arranged offset with respect to each other, the central segment assumes the function of a handle bar. In other words, a longitudinal expansion of the long part of the supply line 150*d* for the filling product in the pushing direction indicated by the arrow will tilt the central segment by simultaneous rotation of both swivel joints 160 and 165 and thereby absorb the occurring tangential stress.

The development with two supply lines with exactly two lying swivel joints represented here is not restricting, but merely illustrating. As described above, more than two supply lines according to one of the inventive developments may be provided, wherein even more than two lying swivel joints may be used. Moreover, vertical swivel joints may be provided in addition to realize a height adjustment of the rotary distributor.

Figure 2:
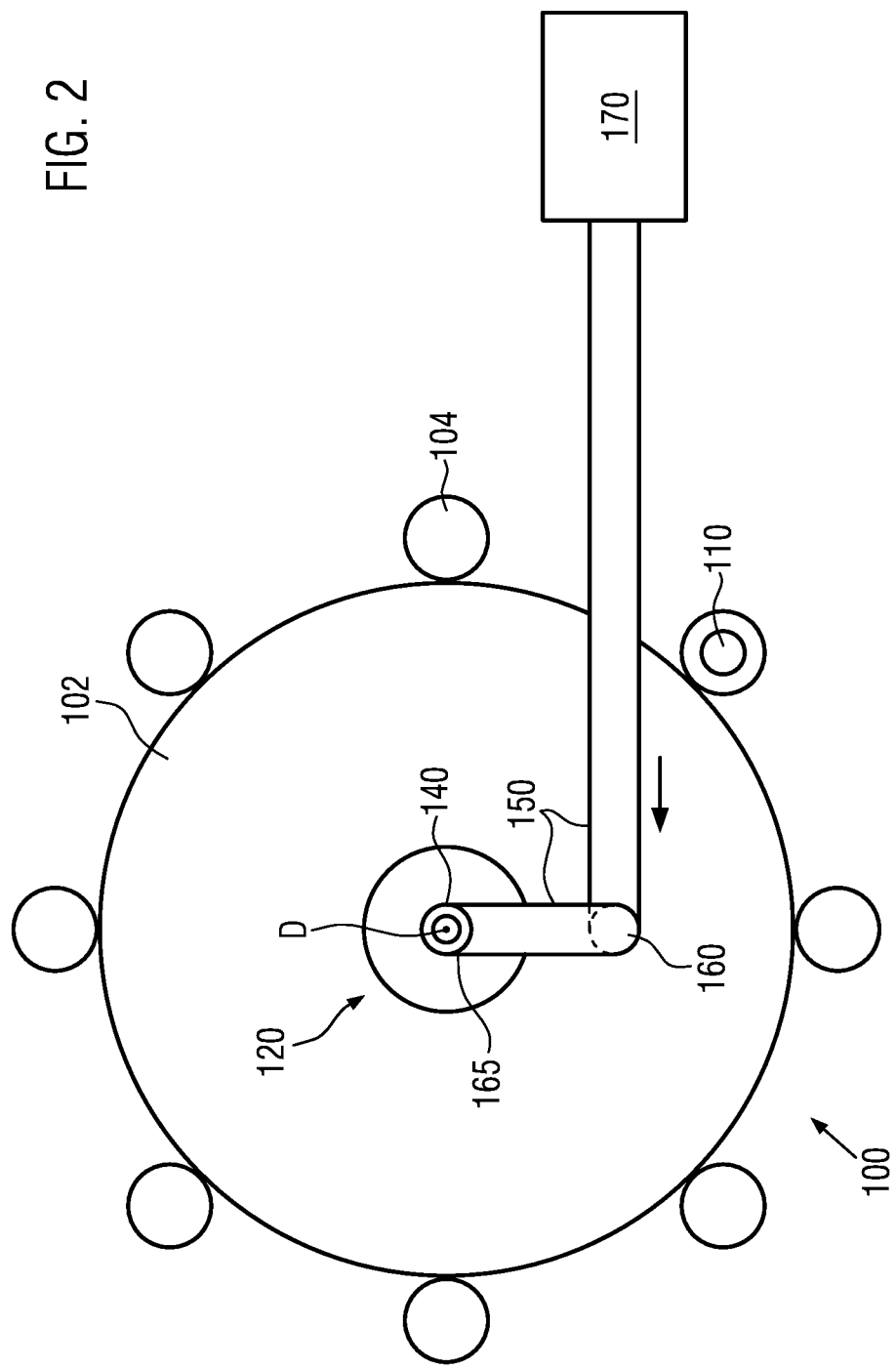
FIG. 2 roughly schematically shows a plan view onto a filling machine according to the present invention.

In FIG. 2, a plan view onto a filling machine according to the present invention is roughly schematically shown. The filling machine 100 has a support 102 rotating about the machine's axis of rotation D at which a plurality of filling elements 104 is arranged which are used for filling containers 110. Furthermore, the filling machine has retainer means which hold the containers. Here, the containers are filled while they are being transported.

Reference numeral 120 designates the rotary distributor described with respect to FIG. 1 which distributes the filling product, for example a beverage, to the individual filling elements 104 via (non-depicted) media lines. Here, the axis of rotation of the rotary distributor 120 and the machine's axis of rotation D of the support 102 coincide.

Among the supply lines for the fluid media, in FIG. 2, only the supply line 150 for the filling product is shown by way of example. The supply line 150 here connects an upper, axial supply point 140 of the rotary distributor 120 with the valve cluster 170 via which the filling product is supplied in a controlled manner. Here, the supply line 150 is directly connected to the axial supply point 140 via a lying swivel joint 165. In addition, the supply line 150 comprises a second lying swivel joint 160, so that the segment of the supply line arranged between the two swivel joints 160 and 165 has, as described, the function of a handle bar.

A longitudinal expansion of the segment of the supply line 150 connected with the valve cluster 170 will thus lead to a shifting in the direction of arrow, whereby the angle between the long and the short segments of the supply line 150 will change. The two lying swivel joints 160 and 165 thereby decouple the longitudinal expansion both from the rotary distributor 120 and from the valve cluster 170. Possibly occurring tension forces are thus absorbed.

The described developments lead, via the rotatability of the two lying swivel joints, to a decoupling of the rotary distributor and the valve cluster and a low power transmission. As a result, damages to the rotary distributor and the valve cluster may be avoided. Equally, the construction is facilitated as an exact positioning of the valve cluster with respect to the rotary distributor is of less importance. Furthermore, a more uniform expansion of the pipelines results. Finally, the represented developments with only two swivel joints are particularly compact, leading to shorter construction times.

The invention claimed is:

1. A filling machine with a device for distributing fluid media for a rotary machine, the device comprising:
   a rotary distributor having a non-rotatably designed first assembly and a second assembly configured to be rotatable about an axis of rotation of the machine, wherein the axis of rotation of the machine is generally vertical and the first assembly comprises one or several supply points for at least one fluid medium, and one or several supply lines for the at least one fluid medium connected with the supply point or supply points, at least one supply line of the one or several supply lines includes two or more lying swivel joints whose axes of rotation are arranged essentially in parallel to the axis of rotation of the machine such that the two or more lying swivel joints are oriented horizontally connecting successive segments of the at least one supply line to each other, wherein one of the successive segments of the at least one supply line is positioned horizontally between two of the two or more lying swivel joints and the two of the two or more lying swivel joints comprises axes of rotation that are arranged offset with respect to each other such that the one of the successive segments positioned horizontally between two of the two or more lying swivel joints moves in a plane perpendicular to the axes of rotation of the two or more lying swivel joints in response to a longitudinal expansion of one or more of the one or several supply lines due to thermal fluctuations.

2. The filling machine according to claim 1, wherein the at least one supply line comprises exactly two lying swivel joints.

3. The filling machine according to claim 1, wherein a segment of the supply line between the two lying swivel joints is embodied in an S-shape or a U-shape or comprises an S-shaped sub-segment and/or a U-shaped sub-segment.

4. The filling machine according to claim 1, wherein at least one of the two or more lying swivel joints connects segments of the supply line at an essentially right angle.

5. The filling machine according to claim 4, wherein a further one of the two or more lying swivel joints connects the supply line to a supply point of the first assembly.

6. The filling machine according to claim 1, wherein the at least one supply line is connected with a supply point of the first assembly for a cleansing agent for CIP cleaning.

7. The filling machine according to claim 1, wherein at least two supply lines with two or more lying swivel joints each are provided, of which a first supply line is connected, by means of a lying swivel joint, to an axially arranged supply point of the first assembly, and a second supply line is connected to a laterally arranged supply point of the first assembly.

8. The filling machine according to claim 1, wherein the first assembly comprises a distributor shaft of the rotary distributor, and the second assembly comprises a distributor head of the rotary distributor, so that the distributor head is embodied to be rotatable with respect to the distributor shaft.

9. The filling machine according to claim 1, further comprising a stationary part of the plant and a part of the plant rotatable with respect to the stationary part of the plant, at which at least one filling valve for filling a container to be filled with the filling product is arranged, wherein the first assembly is arranged at the stationary part of the plant, and the second assembly is arranged at the rotatable part of the plant, and wherein the at least one fluid medium comprises the filling product.

10. The filling machine according to claim 9, wherein the first assembly is firmly connected with the stationary part of the plant.

11. The filling machine according to claim 9, furthermore comprising a valve cluster for supplying the at least one fluid medium, wherein the one or several supply lines connect the valve cluster with the rotary distributor.

12. The filling machine according to claim 9, wherein a supply line for the filling product and at least one further supply line for at least one further fluid medium are provided.

13. The filling machine according to claim 12, wherein the further fluid medium is or comprises a purge gas, a pressurization gas, a sterilization agent, a cleansing agent or control/compressed air.

\* \* \* \* \*